(12) United States Patent
Song (10) Patent No.: US 11,007,682 B2
(45) Date of Patent: May 18, 2021

(54) DOUBLE-SHAFT ROTATING STRUCTURE APPLICABLE TO ELECTRIC HEATING FORMING EQUIPMENT

(71) Applicant: Haitao Song, Shanghai (CN)

(72) Inventor: Haitao Song, Shanghai (CN)

( * ) Notice: Subject to any disclaimer, the term of this patent is extended or adjusted under 35 U.S.C. 154(b) by 272 days.

(21) Appl. No.: 16/310,306

(22) PCT Filed: May 22, 2017

(86) PCT No.: PCT/CN2017/000366
§ 371 (c)(1),
(2) Date: Dec. 14, 2018

(87) PCT Pub. No.: WO2017/215255
PCT Pub. Date: Dec. 21, 2017

(65) Prior Publication Data
US 2019/0329459 A1 Oct. 31, 2019

(30) Foreign Application Priority Data

Jun. 14, 2016 (CN) .......................... 201610422986.0
Jun. 14, 2016 (CN) .......................... 201620571512.8

(51) Int. Cl.
*B29C 41/06* (2006.01)
*B29C 51/00* (2006.01)
(Continued)

(52) U.S. Cl.
CPC ............ *B29C 41/06* (2013.01); *B29C 51/004* (2013.01); *B29C 41/22* (2013.01); *B29C 41/46* (2013.01);
(Continued)

(58) Field of Classification Search
CPC ..... B29C 33/0083; B29C 41/22; B29C 41/46; B29C 51/004; F16H 2003/0933; F16H 3/093
See application file for complete search history.

(56) References Cited

U.S. PATENT DOCUMENTS 2,659,107 A * 11/1953 De Bell .................. B29C 41/06
264/310
3,652,368 A 3/1972 Formo
(Continued)

FOREIGN PATENT DOCUMENTS

CN 101214712 A 7/2008
CN 101298176 A 11/2008
(Continued)

*Primary Examiner* — Michael M. Robinson
*Assistant Examiner* — Victoria Bartlett
(74) *Attorney, Agent, or Firm* — W&K IP (57) ABSTRACT

A double-shaft rotating structure applicable to electric heating forming equipment, comprising: a main shaft, a shell, a first auxiliary shaft, two second auxiliary shafts, a third auxiliary shaft, two first collector slip rings, a second collector slip ring, two fixed disks and a plurality of electric heating elements. The double-shaft rotating structure applicable to electric heating forming equipment may enable a mold on the forming equipment to achieve double-shaft continuous rotation; furthermore, the structure is relatively simple while covering a small floor area, energy-saving and environmentally-friendly, and relatively low-cost.

10 Claims, 11 Drawing Sheets

(51) Int. Cl.
  *B29C 41/22* (2006.01)
  *B29C 41/46* (2006.01)
  *F16H 3/093* (2006.01)

(52) U.S. Cl.
  CPC ...... *F16H 3/093* (2013.01); *F16H 2003/0933* (2013.01)

(56) References Cited

U.S. PATENT DOCUMENTS

| | | | | |
|---|---|---|---|---|
| 3,929,182 | A | * 12/1975 | Amado, Jr. | ............ B22D 13/00 164/114 |
| 2007/0063370 | A1 | * 3/2007 | Steinberger | ............. B29C 33/02 264/109 |

FOREIGN PATENT DOCUMENTS

| | | | |
|---|---|---|---|
| CN | 204487917 U | * | 7/2015 |
| CN | 204487917 U | | 7/2015 |
| CN | 206085455 U | | 4/2017 |
| CN | 106626187 A | | 5/2017 |

* cited by examiner

DOUBLE-SHAFT ROTATING STRUCTURE APPLICABLE TO ELECTRIC HEATING FORMING EQUIPMENT

TECHNICAL FIELD

The present invention relates to the field of electric heating rotomoulding, and in particular, to a double-shaft rotating structure suitable for electric heating forming equipment.

BACKGROUND

A conventional rotomoulding apparatus uses heat generated by combustion of liquefied gas, natural gas or diesel oil as the source of heat energy that firstly heats air in an oven and then is conducted to the mould rotating in the oven via heated hot air. After the inner wall of the mould is heated to the melting point of the plastic raw material, the plastic raw material gradually adheres onto the inner wall of the mould until all the plastic raw material is plasticized and adheres to the inner wall of the mould. Then the heating is stopped, so that the plasticized plastics is cooled and solidified into the shape of the inner wall of the mould. The mould is disassembled, and the product is removed and cooled, completing the processing of the product. In such mode of thermal energy transfer, a large amount of thermal energy is used to heat the air in the huge oven. However, when the heated mould is moved out of the oven, the oven door is completely opened, and large amount of the heat inside the oven is dissipated, which causes low efficiency, high heat dissipation, and tendency to environmental pollution. In addition, Such apparatuses occupy a large ground area, leading to relatively low space utilization rate and relatively high cost.

Recently emerging experimental electric heating rotomoulding apparatuses have been changed by replacing the heating energy sources of traditional liquefied gas, natural gas or diesel oil with electric power source. Most of these apparatuses are of swinging type, in which the mould is continuously rotated about a horizontal central axis, but cannot be rotated continuously about another central axis perpendicular to the horizontal central axis, being limited to limited swinging. This type of swinging apparatus greatly limits the requirements of the rotomoulding process for continuous double-shaft rotation, and therefore cannot be adapted to the processing and production of rotomoulding products having complex shapes.

Another emerging structural mode adopts a double-frame structure, which directs strong current and weak current in 3-4 directions. Such apparatus is complex in structure, and the double-frame structure itself causes inconvenience in operation. Furthermore, the occupation area and space requirements of such double-frame structure are huge, so that the observation of the operating mould is greatly hindered when the double frames are rotating. In addition, the double-frame structure can cause following operation inconveniences: the double-frame structure causes increased distance between the outer frame and the mould, which is very disadvantageous for the operation of the mould and the product by an operator; and the distance between the inner frame and the outer frame greatly affects the layout of the mould on the apparatus, which reduces the efficiency and ability of laying out the mould, and thus causes difficulties to the production of some products that are flat or have a deep groove shape.

The heating sources of currently available experimental electric heating apparatuses include electrically heated gases, microwaves, electric heating tubes, electromagnetic heaters or infrared rays. Regarding the way of electrically heated gas, it still requires firstly heating the air, and then conducting the heat to the mould, which causes relatively low efficiency and waste of heat due to the heat dissipation when replacing the mould. Regarding the electric heating tube, it has the disadvantages of poor heating efficiency and concentrated heating, and thus is not favorable for uniformly heating the mould; and furthermore, its way of heat conduction entails a direct contact with the mould for the purpose of a good heating effect, and thus will cause much difficulties for the distribution and fixation of the electric heating tubes. Regarding the microwave mode, the introduction of the microwave requires the mould to have a large opening for the microwave source, and thus renders such mode not suitable for processing substantially sealed products, which, however, accounts for about 60% of rotomoulding products. Regarding the electromagnetic heater, it has very high demands to the casting processes due to the need of high-frequency current and being buried inside the mould, both of which greatly increase the costs of the mould and the apparatus. The infrared heating is a relatively ideal way of heating. However, in existing electric heating apparatuses, the infrared heater is fixed on the heating box, and the heating box is either stationary or can be only rotated like a swinging machine, both of which keep the infrared heater away from the mould (especially in the case of square or other profiled products) and thus greatly reduced the efficiency of infrared heating, leading to poor effect in practice and hindering the application of this heating technology.

SUMMARY

The object of the present invention is to overcome the disadvantages of the prior art by providing a double-shaft rotating structure suitable for an electric heating forming apparatus, which can achieve double-shaft rotation and has the advantages of simple structure, small footprint, energy-saving, environmental friendliness, and relatively low cost.

The object of the present invention is achieved as follows:
a double-shaft rotating structure suitable for an electric heating forming apparatus, characterized comprising:
a main shaft driven by a main motor to continuously rotate about the horizontal central axis of the main shaft;
a housing disposed at the end of the main shaft and rotated in synchronization with the main shaft;
a first countershaft sleeved in the main shaft and driven by an auxiliary motor to continuously rotate about the horizontal central axis of the first countershaft;
two second countershafts, the ends of which are symmetrically arranged opposite to each other inside the housing, wherein the two second countershafts are respectively hinged perpendicularly to the first countershaft, and the first countershaft drives the two second countershafts via transmission gears to rotate continuously about the central axes of the two second countershafts respectively;
a third countershaft sleeved in the first countershaft and driven by the main rotor to rotate in synchronization with the main shaft, wherein a strong current cable and a weak current control cable are laid in the third countershaft, with a shielding structure being arranged between the strong current cable and the weak current control cable;
two fixing discs for fixing the mould, wherein the two fixing discs are disposed at the ends of the two second countershafts respectively and are rotated in synchronization with the rotation of corresponding second countershafts;

two first collecting slip rings disposed in the housing corresponding to the two second countershafts respectively, wherein the inner rings of the first collecting slip rings are connected to one ends of the strong current cable and the weak current control cable, and the outer rings of the two first collecting slip rings are rotated in synchronization with the corresponding second countershafts thereof;

a second collecting slip ring, wherein the inner ring of the second collecting slip ring is connected to a power supply cable and a control signal cable respectively, the outer ring of the second collecting slip ring is connected to the other ends of the strong current cable and the weak current control cable respectively, and the outer ring of the second collecting slip ring is connected to the third countershaft and rotated with the rotation of the third countershaft;

a plurality of electric heating elements, wherein the lead wire of the electric heating elements is connected to the outer rings of the first collecting slip rings on the same side thereof.

In particular, the second countershaft is hinged to the first countershaft via a bevel gear, and the first countershaft transmits torque via the bevel gear to rotate the second countershaft.

In particular, the inner rings of the two first collecting slip rings are fixed in the housing, the outer rings of the two first collecting slip rings are respectively sleeved in the corresponding second countershaft thereof, and rotated in synchronization with the corresponding second countershaft thereof.

In particular, the strong current cable and the weak current control cable are fixed in the third countershaft through a cable support disc. The cable supporting disc can be locked in position by screw and nut. Of course, other fixing structures in the prior art can also be used to lock the strong current cable and the weak control cable within the third countershaft.

Further, the present invention provides a double-shaft rotating structure which further comprises a replaceable mould frame fixed on the fixing disc, on which one or more moulds are fixed.

In particular, the electric heating element is an infrared heating tube, and one or more heating boxes composed of heating plates are disposed on the mould frame, wherein the infrared heating tube is fixed on heating plates. Based on the electric heating element product as selected in practice, it is ensured that the distance between the heating plate fixed with the electric heating elements and the mould is controlled within the effective working ranges of the electric heating element products.

Further, the mould frame is provided with one or more mould-locking brackets, the heating box is fixed by the mould-locking brackets, and one or more moulds are respectively fixed in the heating box.

Alternatively, the electric heating element can also be resistive heater, which is bonded to the surface of the mould.

Alternatively, the electric heating element may be an electromagnetic heater, which is embedded in the wall of the mould. In practice, the electromagnetic heater should be used in conjunction with a frequency converter, and all the lead wires should be shielded cables. It is common knowledge for those skilled in the art to use an electromagnetic heater as the electric heating element, and thus is not repeated here.

Further, the end of the main shaft can be further extended with an L-shaped arm, and the L-shaped arm is in communication with the third countershaft.

Further, the surface of the mould is provided with a temperature sensing element for monitoring the operation state of the electric heating element.

Under the same concept, the object of the invention can also be achieved as a variant of the invention. A double-shaft rotating structure suitable for an electric heating forming apparatus comprises:

a main shaft driven by a main motor to continuously rotate about the horizontal central axis of the main shaft;

a housing disposed at the end of the main shaft and rotated in synchronization with the main shaft;

a first countershaft sleeved in the main shaft and driven by an auxiliary motor to continuously rotate about the horizontal central axis of the first countershaft;

two second countershafts, the ends of which are symmetrically arranged opposite to each other inside the housing, wherein the two second countershafts are respectively hinged perpendicularly to the first countershaft, and the first countershaft drives the two second countershafts via transmission gears to rotate continuously about the central axes of the two second countershafts respectively;

a third countershaft connected to the housing at one end, disposed coaxially with and opposite to the main shaft, and driven by the main motor to rotate in synchronization with the main shaft, wherein a strong current cable and a weak current control cable are laid in the third countershaft, with a shielding structure being arranged between the strong current cable and the weak current control cable;

two fixing discs for fixing the mould, the two fixing discs being disposed at the ends of the two second countershafts respectively and rotated in synchronization with the rotation of corresponding second countershafts thereof;

two first collecting slip rings disposed in the housing corresponding to the two second countershafts respectively, wherein the inner rings of the first collecting slip rings are connected to one end of the strong current cable and the weak current control cable, and the outer rings of the two first collecting slip rings rotate in synchronization with the corresponding second countershafts thereof;

a second collecting slip ring, wherein the inner ring of the second collecting slip ring is connected to a power supply cable and a control signal cable respectively, the outer ring of the second collecting slip ring is connected to the other ends of the strong current cable and the weak current control cable respectively, and the outer ring of the second collecting slip ring is connected to the third countershaft and rotated with the rotation of the third countershaft;

a plurality of electric heating elements, wherein the lead wire of the electric heating elements is connected to the outer rings of the first collecting slip rings on the same side thereof.

In comparison with the prior art, the invention has the following advantageous effects by adopting the above technical solutions. In particular, the double-shaft rotating structure suitable for the electric heat forming apparatus is provided with two sets of motors and four countershafts. The third countershaft and the main shaft share one main motor, so that the third countershaft rotates in synchronization with the main shaft while the first countershaft can be driven by an auxiliary motor to rotate independently from the main shaft. The two second countershafts are hinged perpendicularly to the first countershaft, so that the mould provided on the fixing disc can be synchronously rotated about the center axis of the corresponding second countershaft with the rotation of the second countershaft while rotating about the horizontal center axis of the main shaft with the rotation of the main shaft, thereby achieving continuous double-shaft rotation, which meets the requirements of a rotomoulding process for continuous double-shaft rotation, and, to the greatest extent, ensures that raw materials can be evenly distributed on the inner wall of the mould. Both the main shaft and the third countershaft are driven by the main motor, thereby ensuring that the cables in the third countershaft will not be twisted during rotation. In comparison with a conventional apparatus, the apparatus of the present invention has simple structure and composition, compact volume, low requirement for operation, low cost, and remarkably improved cost-performance ratio. In addition, the countershaft is sleeved in the main shaft, so that the present apparatus has simple external structure, which greatly facilitates the operation of the mould and the product by the operator, and improves the layout efficiency and capability in the apparatus for profiled and complex products, since observing the operation of the mould and opening/closing the mould will be no longer hindered and restricted by the inner frame and outer frame.

BRIEF DESCRIPTION OF DRAWINGS

Other advantages and features of the present invention are illustrated by the description of the following embodiments of the present invention given by way of example but not limited thereto, in conjunction with the accompanying drawings, in which.

BRIEF DESCRIPTION OF DRAWINGS

As shown in FIGS. 1-5, a double-shaft rotating structure suitable for an electric heating forming apparatus includes a main shaft 10, a housing 38, a first countershaft 5, two second countershafts 37, a third countershaft 1, two first collecting slip rings 71, one second collecting slip ring 72, two fixing discs 36 and a plurality of electric heating elements 85 (which is infrared heating tubes in this embodiment). Two fixing discs 36 are respectively provided at the ends of the two second countershafts 37, and a housing 38 is provided at the end of the main shaft 10.

In particular, the main shaft 10 is fixed onto the frame 73 through a bearing seat 43 and is continuously rotated by the main motor 69 about the horizontal central axis of the main shaft 10. The housing 38 is rotated in synchronization with the main shaft 10. The first countershaft 5 is sleeved in the main shaft 10 via a bearing and driven by the auxiliary motor 74 to continuously rotate about the central shaft thereof. The main shaft 10 is rotated independently of the first countershaft 5. The ends of the two second countershafts 37 are symmetrically arranged inside the housing 38, and are respectively fixed via bearings. The two second countershafts 37 are respectively hinged to the first countershaft 5 via a bevel gear 23, so that the first countershaft 5 transmits torque through the bevel gear 23 and drives the two second countershafts 37 to continuously rotate about the central axes of the second countershaft 37 respectively. In this way, when the main motor 69 and the auxiliary motor 74 are started, the housing 38 disposed at the end of the main shaft 10 are rotated with the rotation of the main shaft 10, and the two second countershafts 37 disposed inside the housing 38 are rotated about the central axis of the main shaft while rotating about the central axes thereof. This process drives the mould on the fixing disc 36 to rotate about the horizontal central axis of the main shaft 10 while rotating synchronously about the central axis of the corresponding second countershaft 37, thereby achieving continuous double-shaft rotation.

The third countershaft 1 is sleeved in the first countershaft 5, and is driven by the main motor 69 to rotate in synchronization with the main shaft 10. A strong current cable and a weak current control cable 82 are laid in the third countershaft 1, and are fixed in the third countershaft 1 by a cable support disc 81. The strong current cable and the weak current control cable are shielded and spaced apart from each other.

The inner rings of the two first collecting slip rings 71 are fixed in the housing 38 and connected to one end of the strong current cable and the weak current control cable 82 near the fixing disc 36, and the outer rings of the two first collecting slip rings 71 are respectively sleeved within the corresponding second countershafts 37, and are rotated in synchronization with the corresponding second countershafts 37. The inner ring of the second collecting slip rings 72 are respectively connected to the power supply cable guided from the power supply cabinet and the control signal cable guided from the control cabinet, and the outer ring of the second collecting slip rings 72 is connected to the other ends of the strong current cable and the weak current control cable 82 respectively, and is connected to the third countershaft 1 and is rotated with the rotation of the third countershaft 1.

Figure 1:
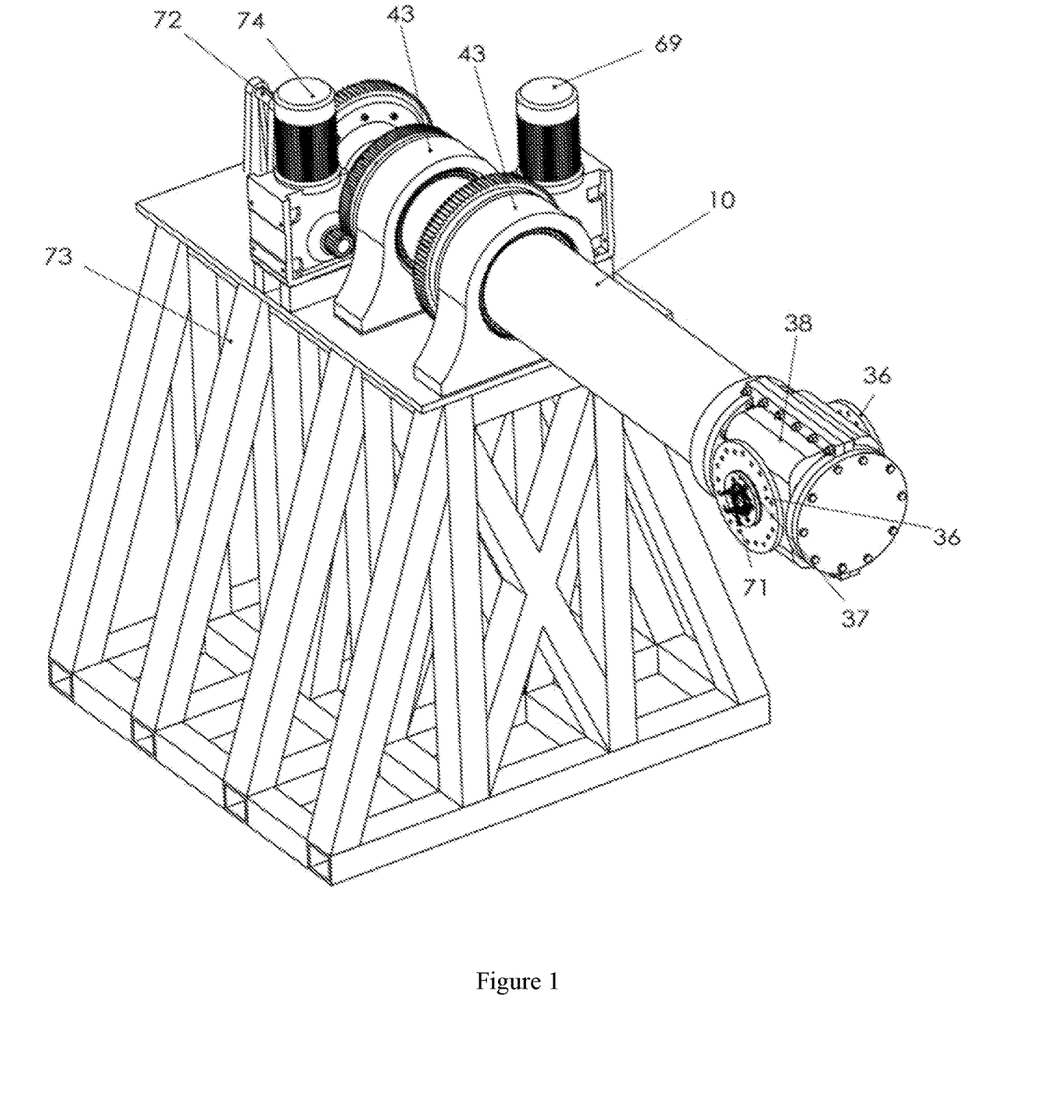
FIG. 1 is a schematic perspective view of one preferred embodiment of a double-shaft rotating structure suitable for an electric heating forming apparatus according to the present invention.
Figure 2:
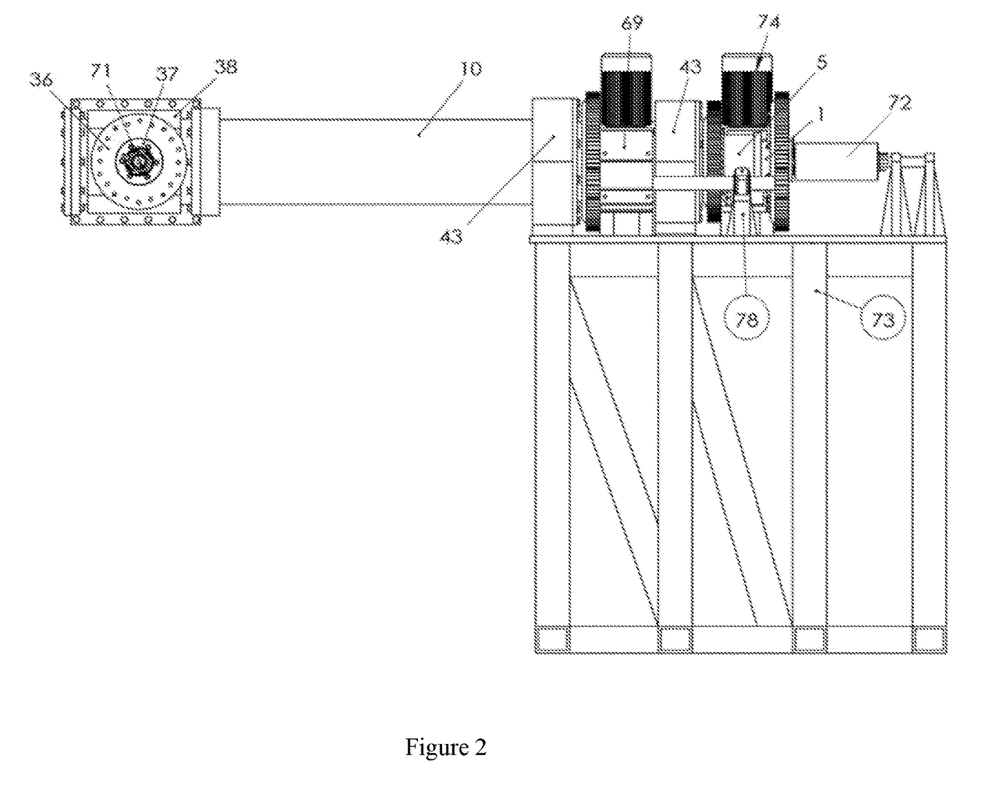
FIG. 2 is a schematic side view of the embodiment shown in FIG. 1 (in which a rotomoulding mould is not installed).
Figure 3:
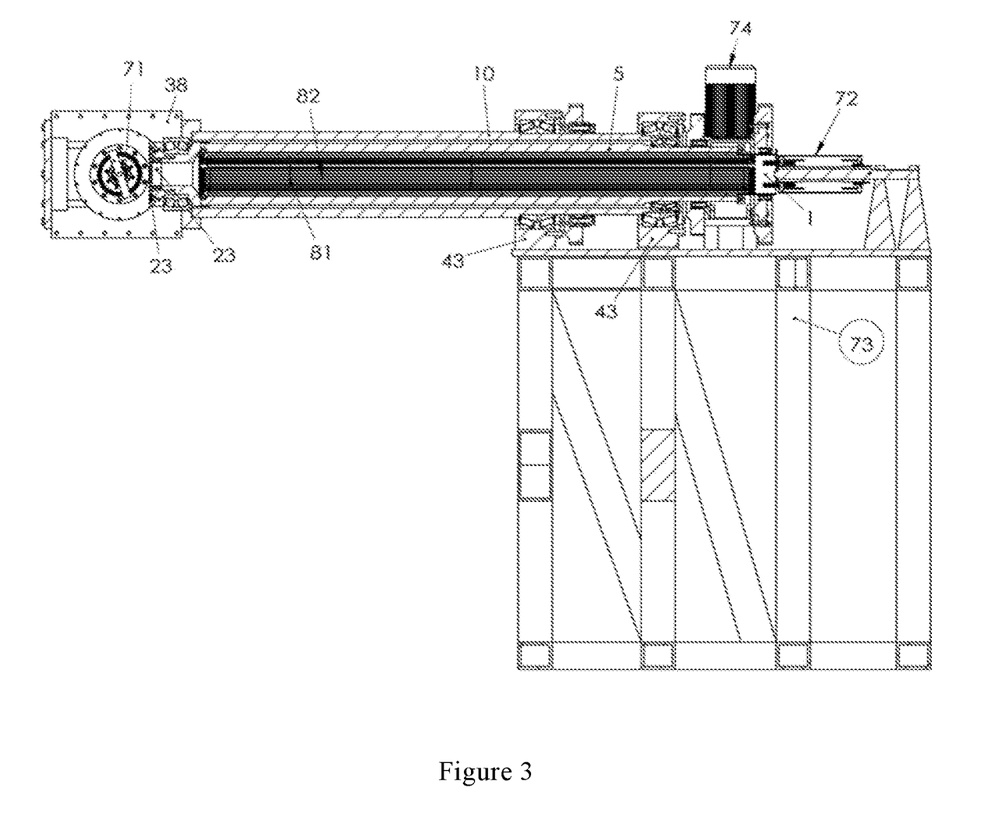
FIG. 3 is a side sectional view of the embodiment shown in FIG. 1.
Figure 4:
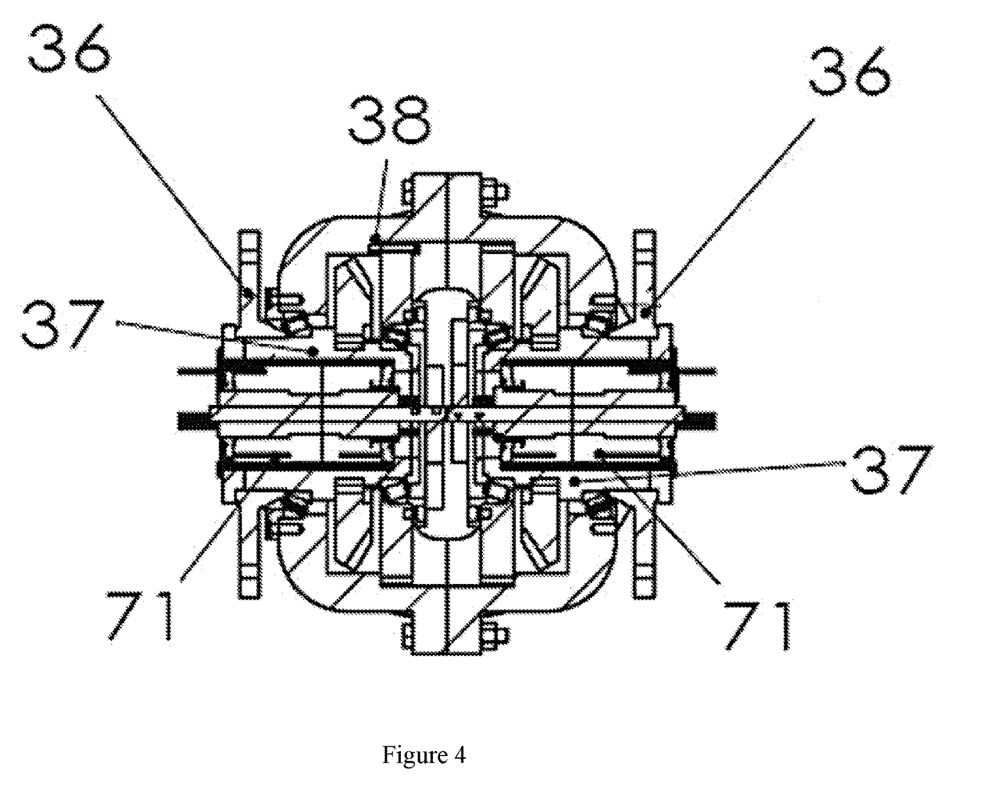
FIG. 4 is a schematic sectional view of the housing of the embodiment shown in FIG. 1.
Figure 5:
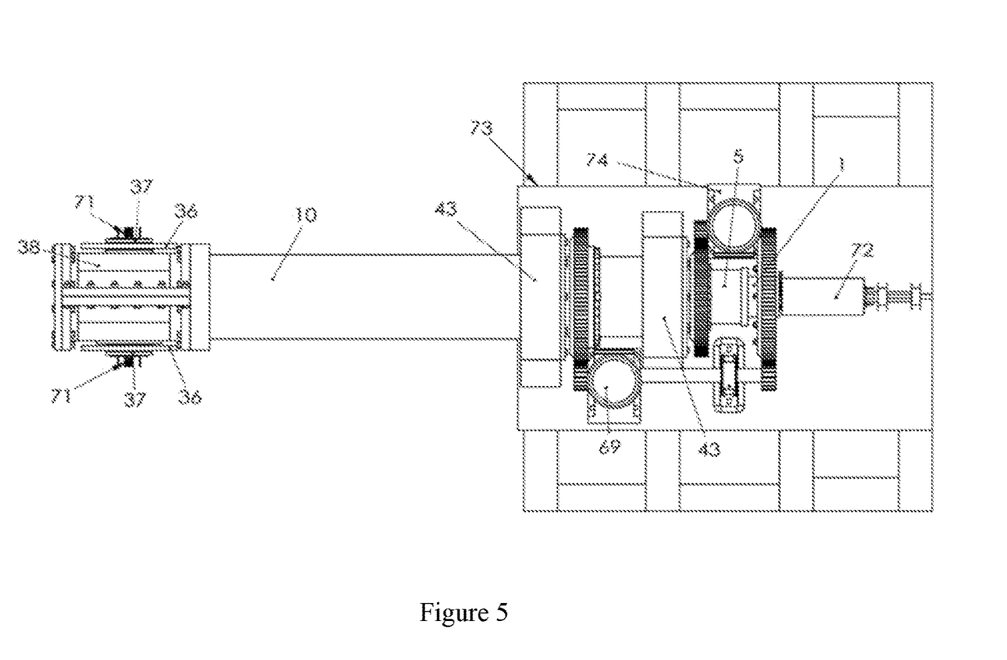
FIG. 5 is a schematic structural view of the embodiment shown in FIG. 1 when viewed from the top.
Figure 6:
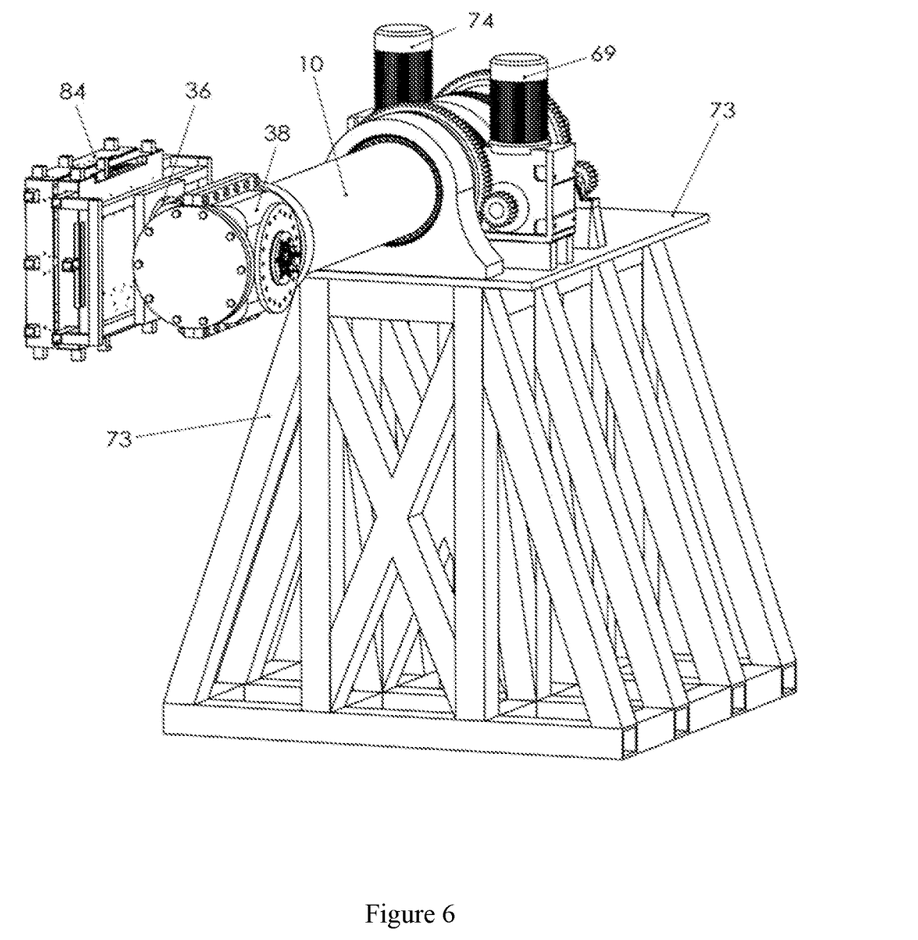
FIG. 6 is a schematic structural view of the embodiment shown in FIG. 1 in which a rotomoulding mould is installed.
Figure 7:
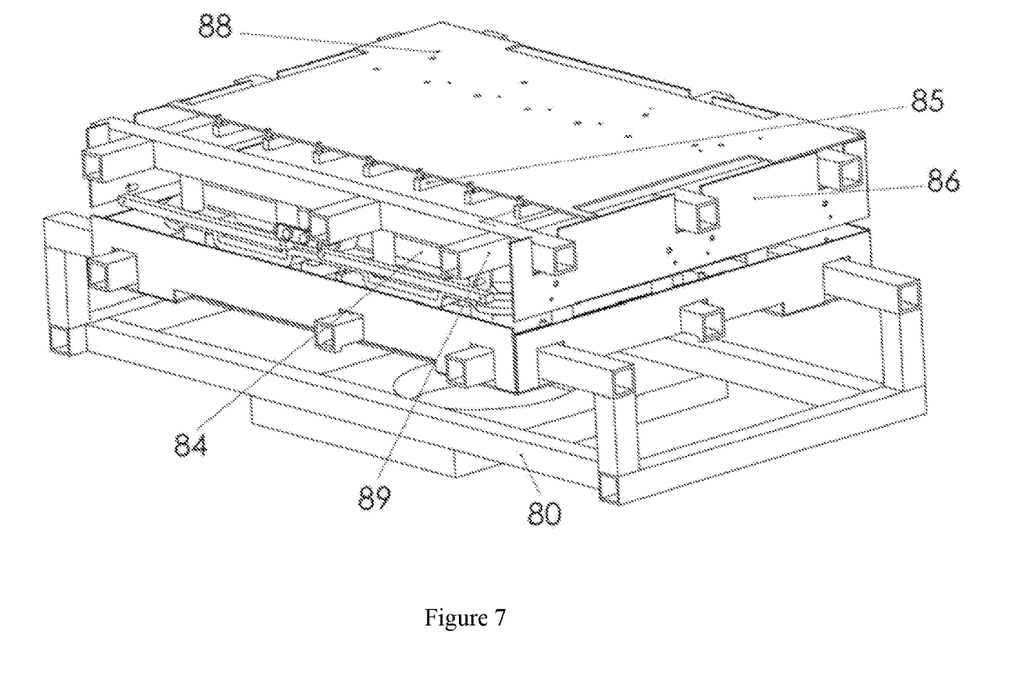
FIG. 7 is a schematic structural view of the rotomoulding mould shown in FIG. 6.

As shown in combination with FIGS. 6 and 7, the mould frame 80 is locked onto the fixing disc 36, and the mould frame 80 is provided with one or more mould-locking brackets 89. One or more moulds 84 can be respectively fixed to the corresponding mould-locking brackets 89, so as to be fixed onto the mould frame 80. A plurality of heating plates 86 compose a heating box, with infrared heating tubes 85 being fixed to the heating plates 86. The distance between the heating plates 86 and the mould 84 is determined according to the effective working range of the selected infrared heating tubes 85. For example, the distance is generally set to be less than 200 mm if most of the economical infrared heating tubes available on the existing market are used, and also, the distance can be set to within 500 mm or other suitable ranges if an infrared heating tube having a relatively large effective working range is used. The lead wire of the infrared heating tube 85 is connected to the outer ring of the first collecting slip ring 71 on the same side through the hole location 88 to achieve the power supplying operation. Thus, both the strong current for heating and the weak current circuit for control can be smoothly conducted to the infrared heating tube for the rotomoulding mould fixed on the fixing disc 36 to heat the mould, completing the production of the rotomoulding product.

In particular, the mould frame 80 can be replaceable. When the number and size of the moulds need to be adjusted, what is needed is only to adjust the size of the mould frame 80.

Preferably, the surface of the mould 84 may also be provided with a temperature sensing element (not shown) for monitoring the operating state of the infrared heating tube. The elements, i.e. the infrared heating tube 84, the PLC console, the temperature controller, the power regulator or the like, form a closed-loop control system for controlling the operation of the infrared heating tube 84. In particular, the temperature sensing element is a contact temperature sensing element or an infrared temperature sensing element.

Figure 8:
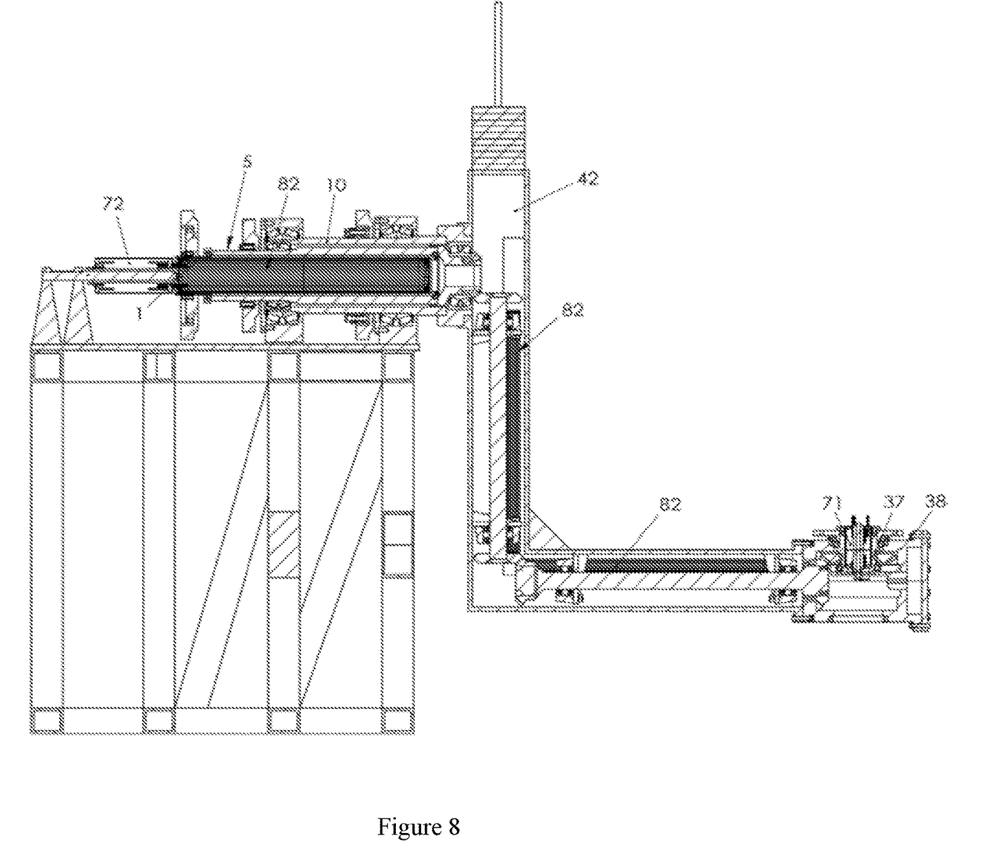
FIG. 8 is a perspective structural diagram of another preferred embodiment of a double-shaft rotating structure suitable for an electric heating forming apparatus according to the present invention.
Figure 9:
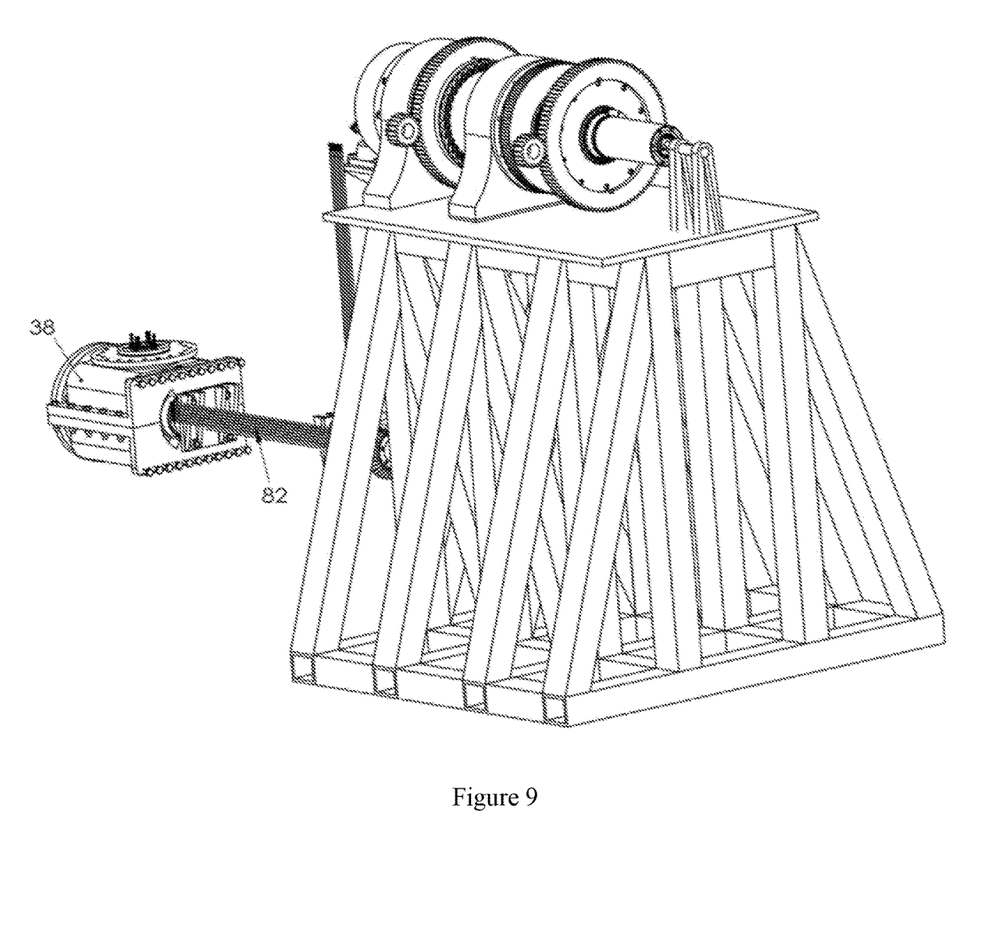
FIG. 9 is a schematic perspective view of the embodiment shown in FIG. 8.

As another embodiment shown in FIG. 8 and FIG. 9, the structure of this embodiment is basically the same as that of the previous embodiment, except that the main shaft 10 in this embodiment is further extended with an L-shaped roller arm 42. The L-shaped roller arm 42 is in communication with the third countershaft 1 so that the strong current cable and the weak current control cable 82 can be continuously laid in the third countershaft 1 and the L-shaped roller arm 42. Such a structure extended with an L-shaped arm is more advantageous for processing a long cylindrical product, or a large-sized product, or a product having both of the aforementioned characteristics.

Figure 10:
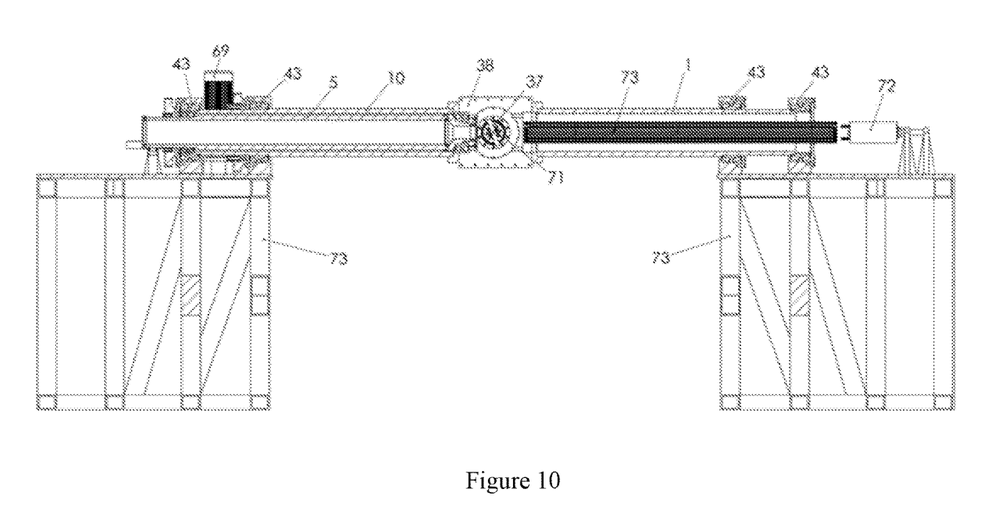
FIG. 10 is a perspective structural diagram of another preferred embodiment of a double-shaft rotating structure of the present invention suitable for an electric heating forming apparatus.
Figure 11:
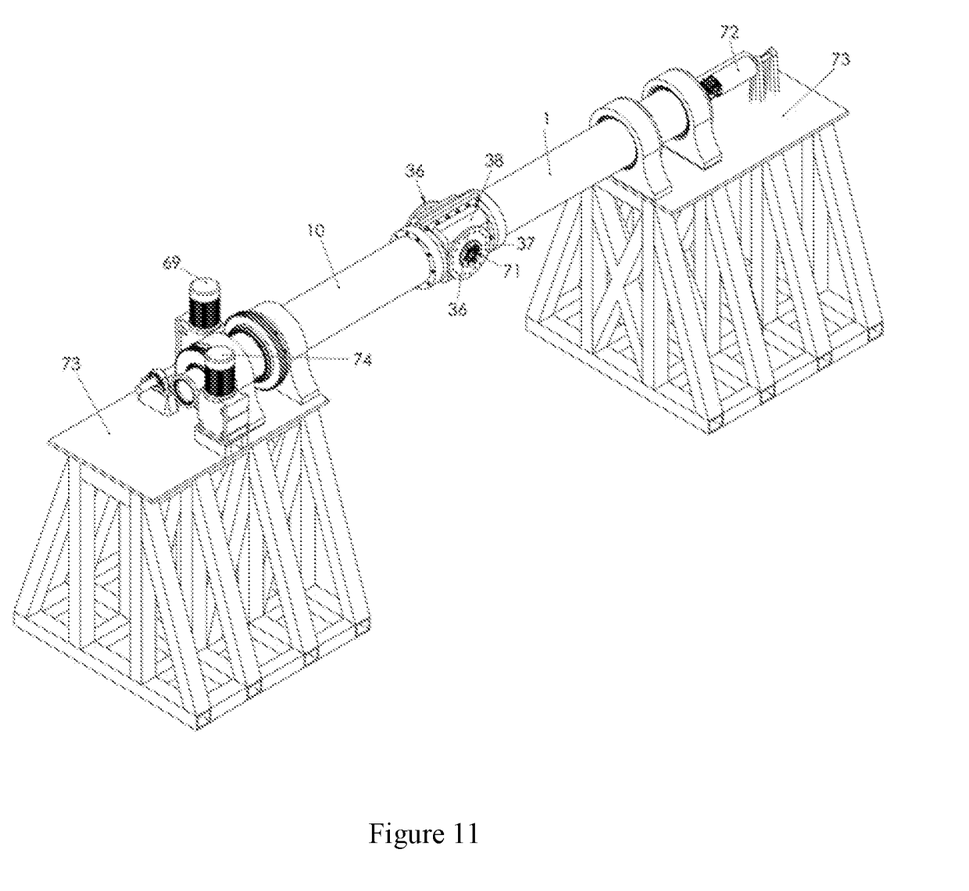
FIG. 11 is a schematic perspective view of the embodiment shown in FIG. 10.

As a further embodiment of the present invention as shown in FIG. 10 and FIG. 11, the structure of this embodiment differs from that of the embodiment shown in FIGS. 1-7 mainly in that, in this embodiment, the third countershaft 1 is not sleeved in the first countershaft 5, but is disposed coaxially with and opposite to the main shaft 10, with one end of the third countershaft 1 being connected to the housing 38.

The embodiment shown in FIG. 10 and FIG. 11 operates in the same way as the embodiments shown in FIGS. 1-7. In this embodiment, the main shaft 10 and the third countershaft 1 are driven by the main motor 69 to rotate continuously and synchronously about the horizontal central axis of the main shaft 10, the housing 38 is rotated in synchronization with the rotation of the main shaft 10, and the first countershaft 5 is driven by the auxiliary motor 74 to continuously rotate about the central axis, where the rotation of the main shaft 10 and that of the first countershaft 5 are independent of each other. The two second countershafts 37 are disposed inside the housing 38, and are respectively fixed by bearings. The two second countershafts 37 are hinged to the first countershaft 5 via the bevel gear 23, and the first countershaft 5 transmits torque through the bevel gear 23, so as to drive the two second countershafts 37 to continuously rotate about their respective central axes. In this way, when the main motor 69 and the auxiliary motor 74 are started, the housing 38 provided at the end of the main shaft 10 is rotated with the rotation of the main shaft 10, and the two second countershafts 37 disposed inside the housing 38 are rotated about the central axis of the main shaft while rotating about the central axis thereof. This process causes the mould on the fixing disc 36 to rotate about the horizontal central axis of the main shaft 10 while rotating synchronously about the central axis of the corresponding second countershafts 37, thereby achieving continuous double-shaft rotation.

Although the present invention has been described above in accordance with the preferred embodiment, it does not mean that the scope of the present invention is limited to the above-described structure. Equivalents and modifications made without departing from the spirit and scope of the present invention are intended to be within the scope of this invention, provided that equivalent alternative structures can be readily developed by those skilled in the art upon reading the above description.

What is claimed is:

1. A double-shaft rotating structure suitable for an electric heating forming apparatus, characterized comprising:
   a main shaft driven by a main motor to continuously rotate about the horizontal central axis of the main shaft;
   a housing disposed at the end of the main shaft and rotated in synchronization with the main shaft;
   a first countershaft sleeved in the main shaft and driven by an auxiliary motor to continuously rotate about the horizontal central axis of the first countershaft;
   two second countershafts, the ends of which are symmetrically arranged opposite to each other inside the housing, wherein the two second countershafts are respectively hinged perpendicularly to the first countershaft, and the first countershaft drives the two second countershafts via transmission gears to rotate continuously about the central axes of the two second countershafts respectively;
   a third countershaft sleeved in the first countershaft and driven by the main motor to rotate in synchronization with the main shaft, wherein a strong current cable and a weak current control cable are laid in the third countershaft, with a shielding structure being arranged between the strong current cable and the weak current control cable;
   two fixing discs for fixing one or more moulds, the two fixing discs being disposed at the ends of the two second countershafts respectively and rotated in synchronization with the rotation of corresponding second countershafts;
   two first collecting slip rings disposed in the housing corresponding to the two second countershafts respectively, wherein inner rings of the two first collecting slip rings are connected to one ends of the strong current cable and the weak current control cable, and outer rings of the two first collecting slip rings are rotated in synchronization with the corresponding second countershafts thereof;
   a second collecting slip ring, wherein an inner ring of the second collecting slip ring is connected to a power supply cable and a control signal cable respectively, an outer ring of the second collecting slip ring is connected to the other ends of the strong current cable and the weak current control cable respectively, and the outer ring of the second collecting slip ring is connected to the third countershaft and rotated with the rotation of the third countershaft; and
   a plurality of electric heating elements, wherein a lead wire of the electric heating elements is connected to the outer rings of the first collecting slip rings on the same side thereof.

2. The double-shaft rotating structure according to claim 1, characterized in that the second countershaft is hinged to the first countershaft via a bevel gear, and the first countershaft transmits torque via the bevel gear to rotate the second countershaft.

3. The double-shaft rotating structure according to claim 1, characterized in that the inner rings of the two first collecting slip rings are fixed in the housing, the outer rings of the two first collecting slip rings are respectively sleeved in the corresponding second countershaft thereof, and rotated in synchronization with the corresponding second countershaft thereof.

4. The double-shaft rotating structure according to claim 1, characterized in that the strong current cable and the weak current control cable are fixed in the third countershaft through a cable support disc.

5. The double-shaft rotating structure according to claim 1, characterized in further comprising a replaceable mould frame fixed on the fixing disc, on which one or more moulds are fixed.

6. The double-shaft rotating structure according to claim 5, characterized in that the electric heating element is an infrared heating tube, and one or more heating boxes composed of heating plates are disposed on the mould frame, wherein the infrared heating tube is fixed on heating plates.

7. The double-shaft rotating structure according to claim 6, characterized in that the mould frame is provided with one or more mould-locking brackets, the heating box is fixed by the mould-locking brackets, and one or more moulds are respectively fixed in the heating box.

8. The double-shaft rotating structure according to claim 1, characterized in that the end of the main shaft is further extended with an L-shaped arm, and the L-shaped arm is in communication with the third countershaft.

9. The double-shaft rotating structure according to any one of claims 1 to 8, characterized in that the surface of the one or more moulds is provided with a temperature sensing element for monitoring the operation state of the electric heating element.

10. A double-shaft rotating structure suitable for an electric heating forming apparatus, characterized comprising:
a main shaft driven by a main motor to continuously rotate about the horizontal central axis of the main shaft;
a housing disposed at the end of the main shaft and rotated in synchronization with the main shaft;
a first countershaft sleeved in the main shaft and driven by an auxiliary motor to continuously rotate about the horizontal central axis of the first countershaft;
two second countershafts, the ends of which are symmetrically arranged opposite to each other inside the housing, wherein the two second countershafts are respectively hinged perpendicularly to the first countershaft, and the first countershaft drives the two second countershafts via transmission gears to rotate continuously about the central axes of the two second countershafts respectively;
a third countershaft connected to the housing at one end, disposed coaxially with and opposite to the main shaft, and driven by the main motor to rotate in synchronization with the main shaft, wherein a strong current cable and a weak current control cable are laid in the third countershaft, with a shielding structure being arranged between the strong current cable and the weak current control cable;
two fixing discs for fixing one or more moulds, the two fixing discs being disposed at the ends of the two second countershafts respectively and rotated in synchronization with the rotation of corresponding second countershafts thereof;
two first collecting slip rings disposed in the housing corresponding to the two second countershafts respectively, wherein inner rings of the first collecting slip rings are connected to one ends of the strong current cable and the weak current control cable, and outer rings of the two first collecting slip rings are rotated in synchronization with the corresponding second countershafts thereof;
a second collecting slip ring, wherein an inner ring of the second collecting slip ring is connected to a power supply cable and a control signal cable respectively, an outer ring of the second collecting slip ring is connected to the other ends of the strong current cable and the weak current control cable respectively, and the outer ring of the second collecting slip ring is connected to the third countershaft and rotated with the rotation of the third countershaft; and
a plurality of electric heating elements, wherein a lead wire of the electric heating elements is connected to the outer rings of the first collecting slip rings on the same side thereof.

* * * * *